United States Patent [19]

Ranganath

[11] Patent Number: 4,706,103
[45] Date of Patent: Nov. 10, 1987

[54] BIPOLAR ELECTRODE SCHEME FOR ELECTRO-OPTIC SEMICONDUCTOR WAVEGUIDE DEVICES

[75] Inventor: Tirumala R. Ranganath, Palo Alto, Calif.

[73] Assignee: Hughes Aircraft Company, Los Angeles, Calif.

[21] Appl. No.: 745,551

[22] Filed: Jun. 17, 1985

[51] Int. Cl.$^4$ .................... H01L 27/14; H01L 29/161
[52] U.S. Cl. ......................... 357/30; 357/16; 350/96.14
[58] Field of Search ................ 357/30, 16; 350/96.14; 300/96.12, 96.13

[56] References Cited

U.S. PATENT DOCUMENTS

| 4,360,246 | 11/1982 | Figueroa et al. | 357/30 |
| 4,448,479 | 5/1984 | Alferness | 350/96.13 |
| 4,518,219 | 5/1985 | Leonberger et al. | 350/96.12 |

FOREIGN PATENT DOCUMENTS

| 52-19551(A) | 2/1977 | Japan | 350/96.14 |
| 59-45424(A) | 3/1984 | Japan | 350/96.14 |
| 2109991(A) | 6/1983 | United Kingdom | 357/30 |

OTHER PUBLICATIONS

Tada et al., "New coupled-waveguide opt. mod. with Schottky contacts," *J. Appl. Phys.*, 49(11), (Nov. 1978), pp. 5404–5406.
Campbell et al., "GaAs electro-optic directional-coupler switch," *Appl. Phys. Lett.*, vol. 27, No. 4, 8/15/75, p. 202.
Leonberger et al., "Low-loss GaAs p$^+$n$^-$n$^+$ 3-D opt. waveguides," *Appl. Phys. Lett.*, vol. 28, No. 10, 5/15/76, p. 616.
Leonberger et al., "GaAs directional-coupler switch w/stepped Δβ rev.," *Appl. Phys. Lett.*, vol. 31, No. 3, 8/1/77, p. 223.
Reisinger et al., "GaAlAs Schottky directional-coup. switch," *Appl. Phys. Lett.*, vol. 31, No. 12, 12/15/77, p. 836.
Carenco et al., "Directional coupler switch in mol.-beam epi. GaAs," *Appl. Phys. Lett.*, vol. 34, No. 11, 6/1/79, p. 755.

*Primary Examiner*—Martin H. Edlow
*Attorney, Agent, or Firm*—V. D. Duraiswamy; V. G. Laslo; A. W. Karambelas

[57] ABSTRACT

A pair of rectifying electrodes (20) are formed on the surface (23) of a semiconductor waveguide device (10) around the waveguide region (18). Rectifying Schottky contacts (22) or p-n junctions (24) can be utilized. A bipolar voltage signal (30) is applied across the rectifying electrodes (20), reducing the voltage and power requirements and producing a bipolar electric field transversely across the waveguide (18). The electrode scheme (20) also provides low microwave loss.

19 Claims, 10 Drawing Figures

BIPOLAR ELECTRODE SCHEME FOR ELECTRO-OPTIC SEMICONDUCTOR WAVEGUIDE DEVICES

BACKGROUND OF THE INVENTION

The invention relates generally to semiconductor waveguide devices in integrated optics and more particularly to the electrode configuration in a semiconductor waveguide device.

Integrated optics utilize light transmission in optical waveguides, structures that confine propagating light to a region with at least one very small dimension. By the resultant miniaturization of individual devices an optical system can be formed on a small substrate. Integrated optics can be used for optical communications.

Waveguides can be made from many different materials utilizing many different techniques. Electro-optic modulators are utilized to impress information on the guided light wave. Some integrated optics modulators function on the principle that an electric field in certain materials produces changes in indices of refraction. Another type of modulator operates on the principle of the directional coupler used in microwave systems by electrically controlling the switching of the guided wave from one channel waveguide to a parallel and identical channel.

A semiconductor heterostructure consists of two different semiconductor materials in junction contact. A heterojunction is a junction in a single crystal between two dissimilar conductors. The two semiconductors differ in energy gap and refractive index. Differences in energy gap permit spatial confinement of injected electrons and holes while differences in refractive index are utilized to form optical waveguides.

The GaAs and $Al_xGa_{1-x}As$ heterostructures have been widely studied. Other III-V and II-VI systems can also be utilized. Materials can be doped either n-or p-type. Semiconductor heterostructures are usually fabricated as single crystal structures using thin film epitaxial crystal growth techniques such as liquid phase epitaxy, chemical vapor deposition and molecular beam epitaxy.

Various semiconductor electro-optic waveguides useful as switches or modulators have been developed, for example, "GaAs Electro-Optic Directional-Coupler Switch", by J. C. Campbell et al., *Applied Physics Letters*, Vol. 27, No. 4, Aug. 15, 1975, pg. 202; "Low-Loss GaAs $p^+n^-p^+$ Three-Dimensional Optical Waveguides", by F. J. Leonberger et al., *Applied Physics Letters*, Vol. 28, No. 10, May 15, 1976, pg. 616; "GaAs Directional-Coupler Switch with Stepped $\alpha\beta$ Reversal", by F. J. Leonberger et al., *Applied Physics Letters*, Vol. 31, No. 3, Aug. 1, 1977, pg. 223; "GaAlAs Schottky Directional-Coupler Switch", by A. R. Reisinger et al., *Applied Physics Letters*, Vol. 31, No. 12, Dec. 15, 1977, pg. 836; "Directional Coupler Switch in Molecular-Beam Epitaxy GaAs", by A. Carenco et al., *Applied Physics Letters*, Vol. 34, No. 11, June 1, 1979, pg. 755.

In waveguide electro-optic devices using semiconductors such as GaAs, applying bipolar fields to the electrodes has not been possible. The prior art devices cited above all utilize an electrode mounted on the top surface of tne waveguide structure and an ohmic contact mounted on the opposing face (bottom surface) of the substrate to apply an electric field to the device to introduce phase shifts through the electro-optic effect, i.e., only single rectifying contacts or junctions are utilized. With a single rectifying contact or junction it becomes necessary to apply unipolar signals to the electrodes; otherwise, the rectifying contact or junction draws a large current and cannot sustain a large voltage. The substrate has an electrical connection. Electric fields also cannot be applied transverse to the waveguide which is necessary for minimizing optical insertion losses. The limitation of applying only unipolar signals to the waveguide results in higher voltage and power requirements on the voltage source.

SUMMARY OF THE INVENTION

Accordingly it is an object of the invention to provide method and apparatus for applying bipolar electric signals to a semiconductor waveguide electro-optic device.

It is also an object of the invention to provide an electrode structure for applying bipolar signals to a semiconductor waveguide electro-optic device.

It is a further object of the invention to apply transverse electric fields across the semiconductor waveguide.

The invention is a method and electrode configuration for applying bipolar fields to semiconductor waveguide electro-optic devices and for applying transverse fields to the waveguide. Pairs of rectifying electrodes are mounted or deposited in a spaced relationship on the surface of the waveguide. Either pairs of rectifying Schottky contacts or p-n junctions can be utilized for electrodes. Since the electrodes are rectifying and arranged back to back relatively large voltages can be applied with negligible current flow. The semiconductor is preferably undoped, high resistivity material. Alternatively, the material should be as weakly doped as possible. The region between the electrodes should be depleted, i.e., no carriers, to maintain a strong static electric field. The ability to apply bipolar signals to introduce phase shifts through the electro-optic effect leads to an improvement by a factor of 2 in the voltage requirements and a factor of 4 in the power requirements of the voltage source. The invention has particular application to very high speed travelling wave modulators since it allows the application of transverse electric fields across the waveguides in semiconductor structures. The invention also allows for the realization of a low microwave loss electrode scheme with impedance in the 25–50 ohm range. This feature is important where optical operation due to an overlying metal film is intolerable.

DETAILED DESCRIPTION OF THE PREFERRED EMBODIMENTS

Figure 1A:
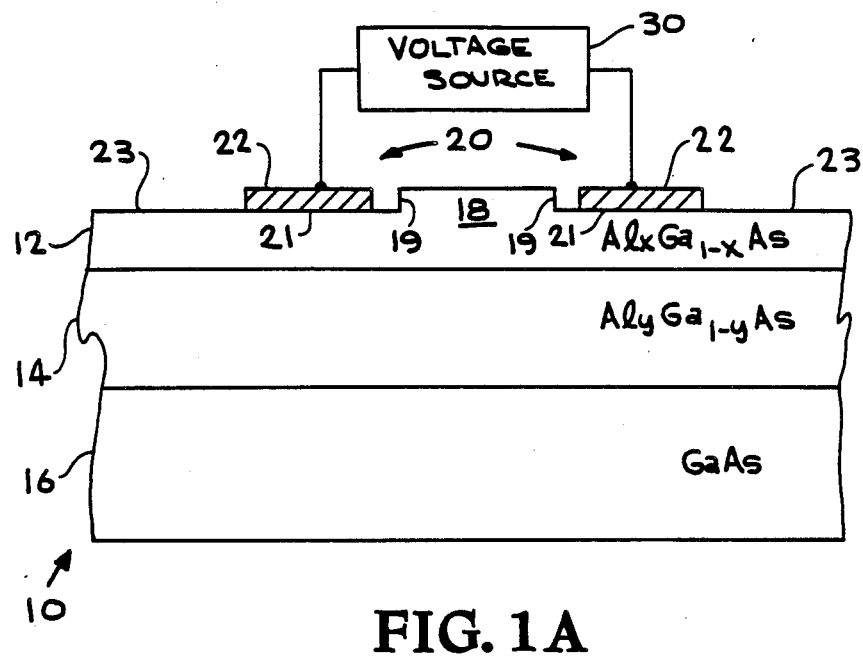
FIG. 1A and B show semiconductor waveguide devices utilizing a pair of rectifying electrodes, Schottky contacts and p-n junctions, respectively.

As shown in FIG. 1 a semiconductor waveguide device 10 comprises a layer 12 of $Al_xGa_{1-x}As$ on a layer 14 of $Al_yGa_{1-y}As$ ($x<y$) on a substrate 16 of GaAs. Waveguide region 18 is formed in the layer 12. The waveguide 18 is formed by providing a region of vertical and horizontal confinement. To provide vertical confinement, the layer 12 must have a greater index of refraction than layer 14; thus $x<y$ in the AlGaAs compositions of each layer. To provide horizontal confinement a surface discontinuity defined by edges 19 is formed around the waveguide region; alternate methods include the placement of spaced metal strips on the surface or the use of a stressing film on the surface.

Figure 1B:
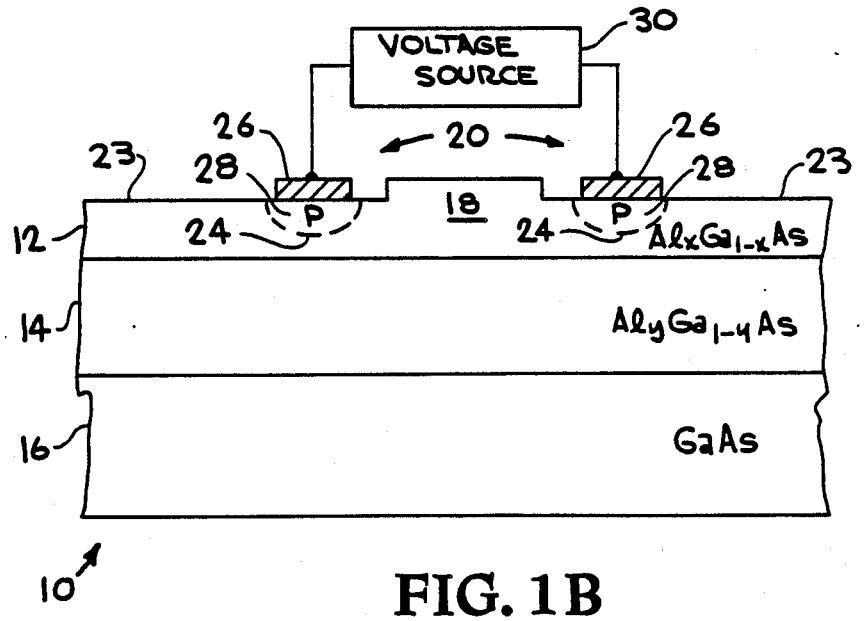

A pair of rectifying electrodes 20 are formed on the surface 23 of layer 12 on both sides of the waveguide region 18. In the embodiment of FIG. 1A rectifying contacts 20 comprise Schottky contacts 22. The contact 22 preferably is spaced from edge 19 to minimize losses but may extend to edge 19. To further reduce losses, a thin layer 21 of the same material of layer 14 may be placed on surface 23 under contact 22. In the embodiment of FIG. 1B rectifying electrodes 20 comprise p-n junctions 24 which have metal contacts 26 on the surface 23 of layer 12 and p-regions 28 formed in layer 12 under metal contact 26. Layer 12 is preferably undoped, or else doped at a sufficiently low level, so that waveguide region 18 is depleted. If layer 12 is undoped, region 28 is preferably n-type but may also be p-type. If layer 12 is slightly n-type, then region 28 is p-type; if layer 12 is slightly p-type, then region 28 is n-type.

By utilizing a pair of rectifying contacts 22 or junctions 24 arranged back to back on either side of waveguide 18, transverse electric fields are applied to waveguide structure 10 by connecting the electrodes 20 to a voltage source 30. With this configuration electric signals of either polarity, i.e., bipolar signals, can be applied to the pair of electrodes 20 without having to worry about leakage currents. In the prior art devices cited above only one polarity of electric signal could be applied since there is only one rectifying contact which could block current flow in only one direction. Also since the electrodes were not on both sides of the waveguide region but located on the top and bottom of the device, a transverse field was not applied. Applying a bipolar electric field across the pair of rectifying contacts the electric field utilization is improved by a factor of 2 and the power output from voltage source 30 is decreased by a factor of 4. Top rectifying contacts allow for the use of a high resistivity substrate that reduces microwave losses and can also reduce substrate parasitics. Electric fields are thus applied transverse to the waveguide, i.e., from side to side rather than normal to the waveguide, i.e., from top to bottom, as shown in the prior art.

Figure 2:
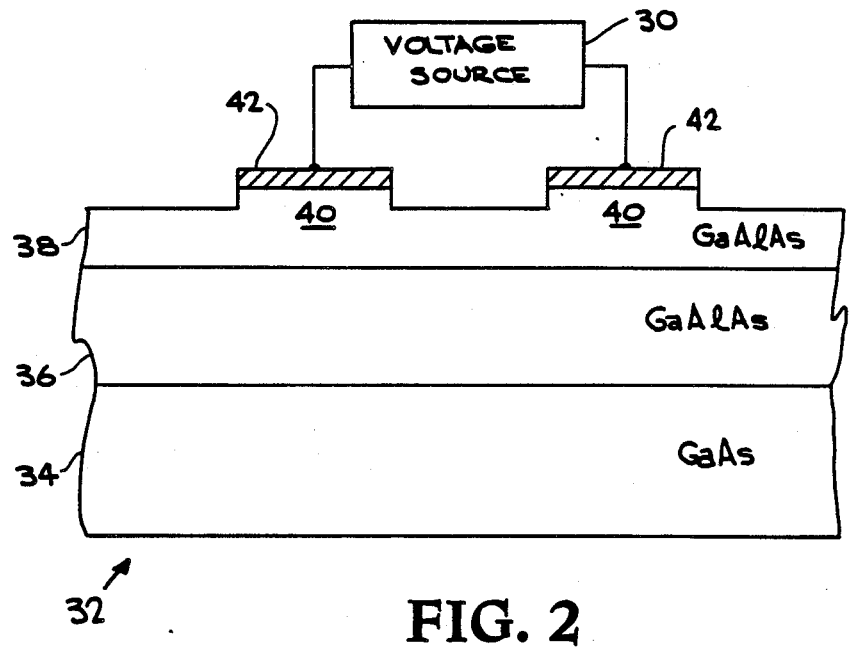
FIG. 2 shows a semiconductor waveguide device having a pair of rectifying electrodes on top of two waveguides.

The application of bipolar electric fields through a pair of rectifying metal contacts can be implemented in a semiconductor device in which the electrode is placed on top of the waveguide itself, as illustrated in FIG. 2. The semiconductor waveguide device 32 comprises a substrate layer 34 of GaAs, an intermediate layer 36 of GaAlAs on substrate 34, and a top layer 38 of GaAlAs on intermediate layer 36. The index of refraction of layer 36 is less than layer 38. A pair of waveguide regions 40 are formed in regions which extend slightly upward from the surface of layer 38. The material of layer 38 is preferably undoped, or very lightly doped, to produce a depleted region. A pair of Schottky contacts 42 are placed on top of the waveguide regions 40 so that bipolar electric signals may be applied to the waveguide regions 40.

All layers in the various embodiments are undoped or lightly doped except where specified as in the p-n junction regions. The upper layer of semiconductor material, as well as the other layers of the device, are preferably undoped and have a high resistivity. If during the fabrication process it is not possible to produce an undoped material, then the layers should be as lightly doped as possible. It is preferable that the waveguide region be depleted, i.e., no carriers, so that large static fields can be maintained.

Figure 3A:
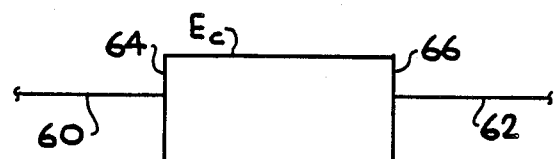
FIG. 3A, B, C, D, E, F show energy band diagrams for a pair of rectifying electrodes and for a prior art single rectifying electrode with an ohmic contact.
Figure 3B:
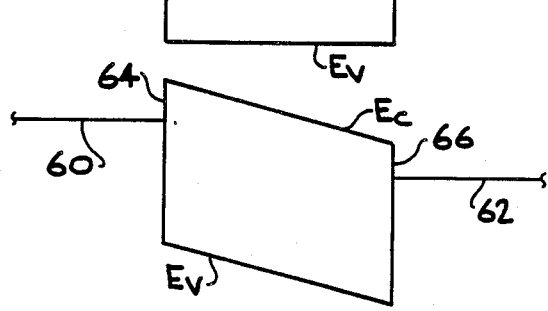
Figure 3C:
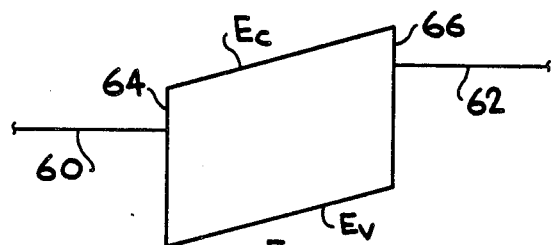

The energy band diagram with no voltage applied to a device with a pair of rectifying electrodes 60, 62 is shown in FIG. 3A. $E_c$ is the conducting band and $E_v$ is the valence band. There are barriers 64, 66, respectively, between the electrodes 60, 62 and the conducting band, which are barriers to conduction. When a voltage of either polarity, negative as shown in FIG. 3B or positive in FIG. 3C, is applied, rectification is provided. In FIG. 3B, the barrier 64 prevents current flow through the device between electrodes 60 and 62; in FIG. 3C, the barrier 66 prevents current flow between electrodes 62 and 60. Therefore, a bipolar field can be applied without conducting through a pair of rectifying electrodes because of the energy band discontinuities in both directions. The two-way rectification occurs for both electron flow and hole flow.

Figure 3D:
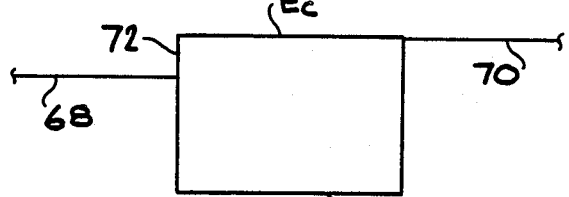
Figure 3E:
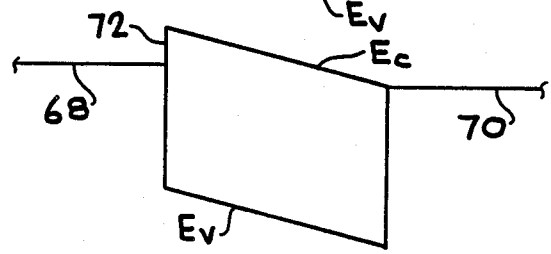
Figure 3F:
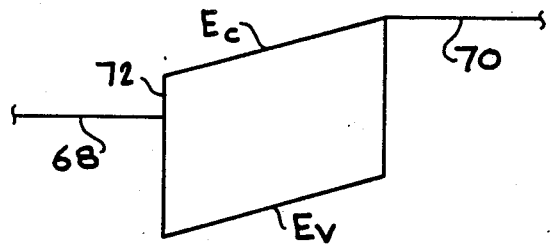

By comparison, the energy band diagram with no voltage applied to a prior art device with a single rectifying contact 68 and an ohmic (nonrectifying) contact 70 is shown in FIG. 3D. There is only a single barrier 72 provided by rectifying contact 68; ohmic contact 70 is at the conduction band. Thus, when one polarity (negative) is applied, in FIG. 3E, the barrier 72 prevents conduction through the device between electrodes 68 and 70. However, with the reverse polarity (positive) of FIG. 3F, there is conduction through the device from ohmic contact 70 to electrode 68 since there is no rectifying barrier in this direction and thus a field cannot be maintained with this polarity.

Figure 4:
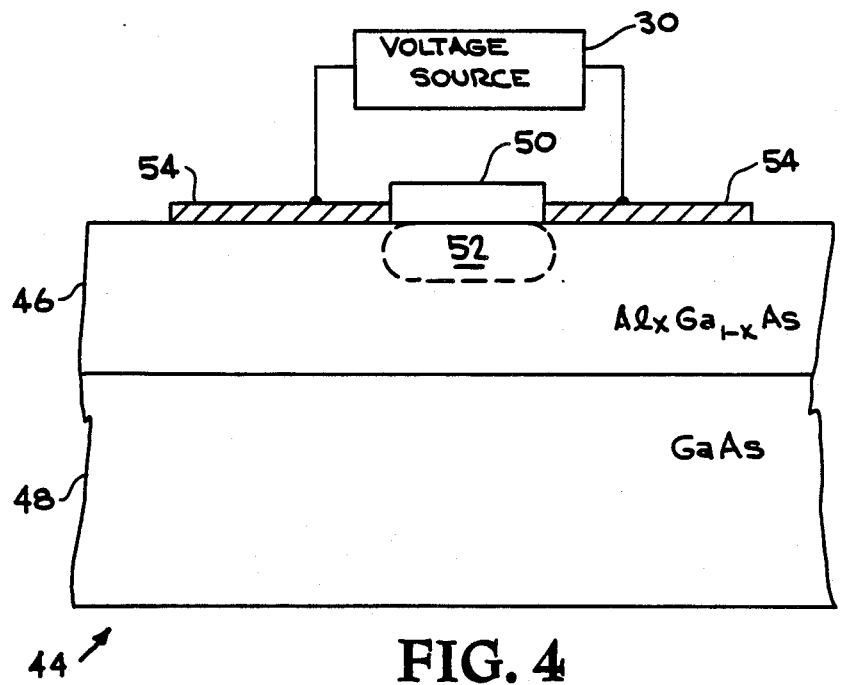
FIG. 4 shows a stress induced waveguide having a pair of rectifying contacts.

A stress induced waveguide device 44 is illustrated in FIG. 4. A layer 46 of $Al_xGa_{1-x}As$ is formed on a substrate 48 of GaAs. A stressing film 50 is applied to the surface of semiconductor layer 46 to form a waveguide region 52 in the region of layer 46 underneath the film 50. The stressing film 50 provides vertical as well as horizontal confinement so no intermediate layer between layer 46 and substrate 48 is necessary. A pair of rectifying Schottky contacts 54 are formed around the stressing film 50 so that the electrodes 54 are positioned on either side of waveguide region 52. A bipolar voltage signal can be applied across the contacts 54 and a transverse electric field through waveguide region 52 can be produced.

As generally described, the pair of rectifying electrodes are placed on a single surface of the waveguide device, typically in a coplanar spaced configuration. However, the two electrodes can be at different levels on a single surface (e.g., one slightly raised from the other) or even on different surfaces and still provide the rectifying action shown in FIGS. 3B, C.

As an example, in the device of FIG. 1A, the layer 12 is typically 2-4 microns thick, layer 14 is 5-10 microns, and substrate 16 is 250 microns. The edges 19 extend 0.5–1.0 microns from surface 23 and the width of region 18 (between edges 19) is 5 microns.

Although the illustrative embodiments have utilized GaAs-GaAlAs semiconductor structures, other III-V semiconductor systems can also be utilized. These include ternary semiconductors, e.g., InGaAs-InP, or quaternary semiconductors, e.g., InGaAsP-InP. The invention can also be utilized for stripline configurations for microwave applications.

Changes and modifications in the specifically described embodiments can be carried out without departing from the scope of the invention which is intended to be limited only by the scope of the appended claims.

What is claimed is:

1. An electrode assembly for applying a bipolar electric field to an electro-optical waveguide region formed in a semiconductor structure, comprising a pair of rectifying electrodes formed on the semiconductor structure about the waveguide region; and means for applying a bipolar voltage exclusively across said electrodes.

2. The electrode assembly of claim 1 wherein the pair of electrodes are formed on a single surface of the semiconductor structure.

3. The electrode assembly of claim 2 wherein the pair of electrodes are substantially coplanar.

4. The electrode assembly of claim 1 wherein the rectifying electrodes are Schottky contacts.

5. The electrode assembly of claim 1 wherein the rectifying electrodes are p-n junctions.

6. The electrode assembly of claim 1 wherein the means for applying said bipolar voltage comprises a voltage source exclusively connected across the electrodes.

7. A semiconductor waveguide device, responsive to bipolar voltages applied to a waveguide region in said waveguide device, said device comprising:
   a plurality of layers of semiconductor material, including a substrate of undoped highly resistive semiconductor material, an intermediate layer of undoped highly resistive semiconductor material formed on the substrate, and an upper layer of undoped highly resistive semiconductor material formed on the intermediate layer, said layers defining a waveguide region therein; and
   a pair of rectifying electrodes formed back-to-back on said semiconductor material around the waveguide region.

8. The waveguide device of claim 7 wherein the rectifying electrodes are formed on a single surface.

9. The waveguide device of claim 7 wherein the rectifying electrodes are Schottky contacts.

10. The waveguide device of claim 7 wherein the rectifying electrodes are p-n junctions.

11. A semiconductor waveguide device responsive to bipolar voltages applied to a waveguide region in said waveguide device, said device comprising:
    a plurality of layers of semiconductor material defining said waveguide region therein, wherein said layers comprise a substrate of undoped highly resistive GaAs, an intermediate layer of undoped highly resistive $Al_yGa_{1-y}As$ formed on the substrate, and an upper layer of undoped highly resitive $Al_xGa_{1-x}As$ ($x<y$) formed on the intermediate layer, the waveguide region being formed in the upper layer; and
    a pair of rectifying electrodes formed back-to-back on said semiconductor material around the waveguide region.

12. The waveguide device of claim 7 wherein the waveguide region is substantially depleted.

13. The waveguide device of claim 7 further including a voltage source connected exclusively across the electrodes for applying a bipolar electric field transversely to the waveguide region.

14. A method for applying a bipolar electric field across a waveguide region in a semiconductor device having a substrate of undoped highly resistive semiconductor material, an intermediate layer of undoped highly resistive semiconductor material formed on the substrate, and an upper layer of undoped highly resistive semiconductor material formed on the intermediate layer, the waveguide region being formed in the upper layer, said method comprising:
    forming a pair of rectifying electrodes on the semiconductor device around the waveguide region; and
    applying a bipolar voltage signal across the pair of electrodes.

15. The method of claim 14 wherein the electrodes are formed by Schottky contacts.

16. The method of claim 14 wherein the electrodes are formed by p-n junctions.

17. The method of claim 14 further comprising forming the waveguide region in a substantially depleted region.

18. The method of claim 14 further comprising applying the voltage signal substantially transversely across the waveguide region.

19. A semiconductor waveguide device, responsive to bipolar voltages applied to a waveguide region in said waveguide device, said device comprising:
    a plurality of layers of semiconductor material defining a waveguide region therein; and
    a pair of rectifying electrodes formed back-to-back on the semiconductor material on top of the waveguide region.

* * * * *